(12) United States Patent
Fujino

(10) Patent No.: US 7,178,110 B2
(45) Date of Patent: Feb. 13, 2007

(54) FILE PROCESSING APPARATUS AND COMPUTER-READABLE STORAGE MEDIUM STORING A PROGRAM FOR OPERATING A COMPUTER AS A FILE PROCESSING APPARATUS

(75) Inventor: Akinobu Fujino, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 986 days.

(21) Appl. No.: 09/781,966

(22) Filed: Feb. 14, 2001

(65) Prior Publication Data

US 2001/0013877 A1   Aug. 16, 2001

(30) Foreign Application Priority Data

Feb. 15, 2000   (JP) .......................... P2000-036221

(51) Int. Cl.
*G06F 17/00*   (2006.01)

(52) U.S. Cl. .................. 715/838; 715/771; 715/841; 715/847; 715/967

(58) Field of Classification Search ............... 325/742, 325/741, 743; 715/771–773, 841–848, 967, 715/966, 969

See application file for complete search history.

(56) References Cited

U.S. PATENT DOCUMENTS 5,065,347 A * 11/1991 Pajak et al. .................. 345/835
5,644,736 A * 7/1997 Healy et al. ................. 345/784
5,838,319 A * 11/1998 Guzak et al. ................ 345/854
6,181,342 B1 * 1/2001 Niblack ....................... 345/635
6,415,298 B1 * 7/2002 Oesterer et al. ............. 707/203
6,452,609 B1 * 9/2002 Katinsky et al. ............. 345/716

FOREIGN PATENT DOCUMENTS

JP   6-19669   1/1994

* cited by examiner

*Primary Examiner*—Kristine Kincaid
*Assistant Examiner*—Peng Ke
(74) *Attorney, Agent, or Firm*—Nixon & Vanderhye P.C.

(57) ABSTRACT

The invention provides a file processing apparatus, with which files can be selected easily when subjecting files to a predetermined process. A window W that is displayed during file processing is partitioned into three regions, namely a file display window W1, a selected file display window W2, and an execution icon display window W3. While ascertaining the contents of the files in a predetermined folder and comparing among the files with the icons displayed as thumbnails in the file display window W1, the user can select files to be processed by double-clicking. Once a file has been selected, it is displayed as an icon in the window W2, so that file selection can be performed easily and accurately while scrolling down the window, for example. After the file selection is terminated, a process can be executed, for example by double-clicking a process icon displayed in the window W3.

20 Claims, 13 Drawing Sheets

FILE PROCESSING APPARATUS AND COMPUTER-READABLE STORAGE MEDIUM STORING A PROGRAM FOR OPERATING A COMPUTER AS A FILE PROCESSING APPARATUS

BACKGROUND OF THE INVENTION

1. Field of the Invention

The present invention relates to a file processing apparatus (computer) for subjecting one or more data files stored on a storage medium to a process, and in particular to a user interface portion thereof.

2. Description of the Related Art

In Microsoft Windows™ (95, 98, NT, etc.), which is widely used as an operating system for personal computers, it is possible to subject data files such as image files and text files (in the following referred to simply as "files") to predetermined processes (for example deleting, moving, displaying, reproducing, mailing, etc.) by dragging and dropping the icons. That is to say, when the user wants to subject a predetermined file to a predetermined process, the user can drag and drop the file's icon for example with a mouse onto a process icon. Furthermore, in Windows, it is also possible to process at once (together) a plurality of files in the same folder by dragging and dropping a plurality of files in the same folder together onto one process icon.

In various software programs executable on Windows, it is also possible to display the content of files as thumbnails (miniature images). Using such icons displayed as thumbnails, mistakes, such as the erroneous processing of the wrong file, can be prevented, and files can be selected while comparing their contents.

Furthermore, Japanese Unexamined Patent Publication JP-A 6-19669 (1994) discloses a technology for easily comparing files when processing icons by dragging and dropping, using icons in which the file contents are displayed as thumbnails.

However, these conventional technologies pose the following problems:

In Windows, for example, when it is not necessary to display all icons for a plurality of files in one folder, it may be necessary to scroll the window to select a plurality of files, and in this case, it is very difficult to compare and examine, even when the contents of the files are displayed as thumbnails.

Also, in Windows, there is the problem that it is not possible to simultaneously select files spanning a plurality of folders. To subject files spanning a plurality of folders to the same processing, the same processing has to be repeated for each of those folders, which can be very troublesome.

Furthermore, it is not possible to drag and drop selected files onto a plurality of icons, and when subjecting the same files to two or more processes, selecting the files and dragging and dropping them has to be repeated for each of those processes, because the selection information for those files is lost once the files have been processed by dragging and dropping.

The same problems also exist for the invention disclosed in the aforementioned JP-A 6-19669.

SUMMARY OF THE INVENTION

With the above situation in mind, it is an object of the invention to present a file processing apparatus, with which files can be selected easily when subjecting files to a predetermined process.

To attain these objects, the invention provides a file processing apparatus comprising: file display means for displaying a predetermined file in a predetermined file display region as an icon; selected file storage means, in response to a selection request with regard to a predetermined file displayed in the file display region, for storing a selected file; selected file display means for displaying the selected file in a predetermined selected display region as an icon; and process execution means, in response to a predetermined process request, for subjecting a file stored by the selected file storage means to a predetermined process.

With this configuration, selected files to be processed can be displayed as icons in a predetermined selected file display region, so that the file selection can be performed easily and accurately while scrolling down the window, for example.

In the invention it is preferable that the file display means displays the files in the file display regions as thumbnails.

With this configuration, mistakes such as the selection of the wrong files can be prevented, and it is easy to compare among a plurality of files.

In the invention it is preferable that the file processing apparatus further comprises selected file cancellation means, in response to a predetermined selection cancel request (such as clicking a "Clear" button), for canceling the selection of a portion or all of the files stored by the selected file storage means.

With this configuration, files that have been selected can be cancelled afterwards if necessary, so that it is possible to compare and examine files with less commitment.

In the invention it is preferable that the selected file display means displays files as thumbnails in the selected file display region.

With that configuration, it is easier to compare and examine the selected files. Moreover, if combined with the selected file cancellation means, then it is possible temporarily to select a plurality of files displayed at a remote position within the file display region, display them as thumbnails in the selected file display region, and then to cancel the selection of files that are deemed to be unnecessary upon further comparison and deliberation.

In the invention it is preferable that the selected file storage means stores files selected from among a plurality of folders, and that the selected file display means displays these files in one selected file display region.

With this configuration, it is possible to subject a plurality of files spanning different folders to a process together. Moreover, since files from different folders are displayed in the selected file display region like files from the same folder, it is easy to compare and examine files, regardless of where the files are located.

In the invention it is preferable that the file processing apparatus further comprises folder display means for displaying the folders in which files displayed by the selected file display means in the selected file display region are actually located.

With this configuration, the user does not have to remember the folder in which a selected file is located, and it is easy to reconsider the selection of files that have been selected only preliminarily and compare them with other files within the same folder.

In the invention it is preferable that the selected file storage means keeps storing the selected files, even after a process has been executed by the process execution means, until a predetermined selection cancel request.

With this configuration, it is not necessary to perform the troublesome procedure of repeatedly selecting and processing files in order to subject the same group of selected files to a plurality of processes, which makes the procedure simpler.

In the invention it is preferable that the file processing apparatus further comprises process storage means for storing a plurality of process requests, and that the process execution means subjects the files stored by the selected file storage means to a plurality of processes, in response to the plurality of process requests stored in the process storage means.

With this configuration, it is not necessary to perform the troublesome procedure of repeatedly selecting files and selecting processes in order to subject the same group of selected files to a plurality of processes, which makes the procedure simpler.

In the invention it is preferable that the file processing apparatus further comprises file selection means for selecting, from among an arbitrary plurality of files, those files that match a predetermined condition.

With this configuration, the file selection procedure is simplified by making it possible to automatically select files matching predetermined conditions.

In the invention it is preferable that the file selection means selects files from within an arbitrarily defined range.

This configuration simplifies the file selection procedure.

In the invention it is preferable that the file processing apparatus is realized by executing a program on a computer, such as a personal computer. The program executed on the computer as a file processing apparatus can be provided to the user stored on a storage medium, such as a CD-ROM, or distributed over a network, such as the internet.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Now referring to the drawings, preferred embodiments of the invention are described below.

The invention will be better appreciated upon the following explanation of the preferred embodiments, with reference to the accompanying drawings. It should be noted that the following embodiments are merely specific examples of the invention, and are in no way intended to be limiting to the technical scope of the invention.

The following is an explanation of specific embodiments of a file processing apparatus in accordance with the invention, in the order of the corresponding claims. These file processing apparatuses can be realized by executing a program on a computer, such as a personal computer or a work station, for example.

Embodiment 1

Figure 1:
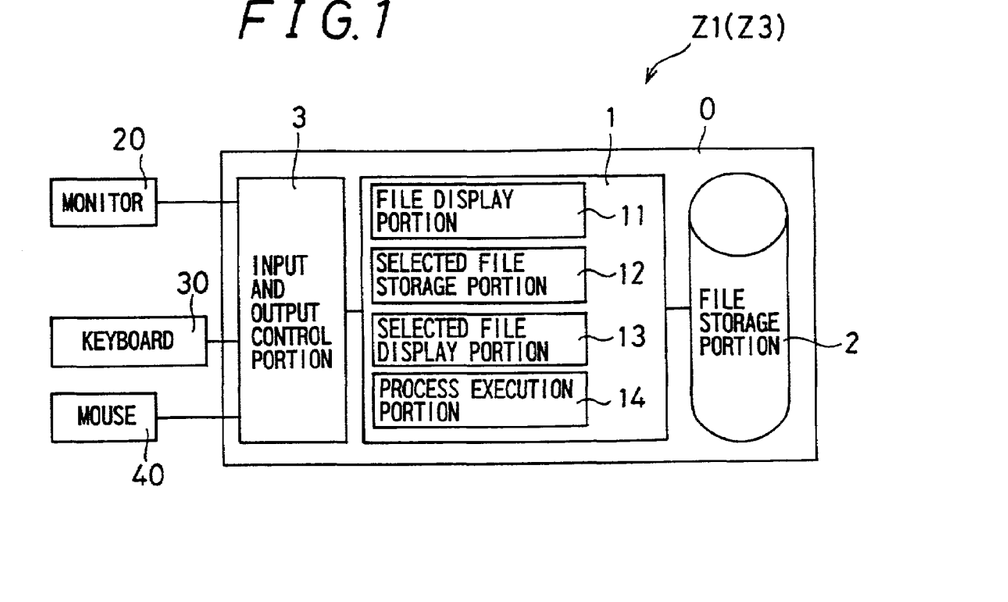
FIG. 1 is a block diagram showing the general configuration of a file processing apparatus Z1 (Z3) in accordance with Embodiment 1 (3) of the invention.

As shown in FIG. 1, a file processing apparatus Z1 in accordance with Embodiment 1 includes a computer main body 0, as well as a monitor 20, a keyboard 30, and a mouse 40, which serve as input/output devices connected to the computer main body 0.

The computer main body 0 is internally provided with a file storage portion 2 which may be, for example, a hard-disk apparatus for storing files such as image files and text files to be processed, a file operating portion 1 which performs various operations on the files in the file storage portion 2, and an input/output controller 3 which performs input/output control between the file operating portion 1 and input/output devices (that is, a monitor 20, a keyboard 30 and a mouse 40). Moreover, the file operating portion 1 includes a file display portion 11, a selected file storage portion 12, a selected file display portion 13, and a process execution portion 14.

Here, the portions in the file operating portion 1 are realized as virtual elements by executing a program on the computer main body 0.

The following is a more specific explanation of the configuration and operation of the file processing apparatus Z1.

Figure 3:
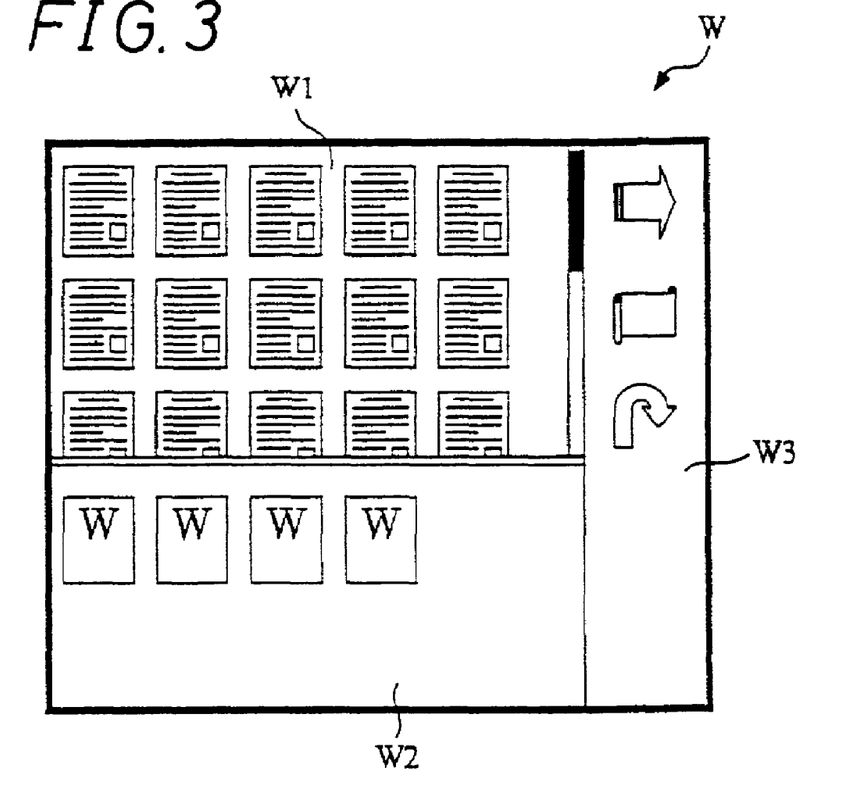
FIG. 3 shows an example of a display screen for the file processing apparatus Z1.

FIG. 3 illustrates the image of a window W that is displayed on the monitor 20 of the file processing apparatus Z1. This window W is partitioned into three regions, namely a file display window W1, a selected file display window W2, and an execution icon display window W3.

In the file display window W1 (example of a predetermined file display region), the file display portion 11 displays the icons of files inside a folder selected for example by the user. These icons display the contents of the files as thumbnails (miniature images), so that the contents of the files can be roughly grasped at a single look. Thus, mistakes, such as selecting the wrong file, can be prevented, and it becomes easy to compare among a plurality of files. If it is not possible to display all files in the folder in this file display window W1 at once, then it is possible to scroll the window by dragging the scroll bar displayed on the side of the window with the mouse 40, for example.

The selected file display window W2 (example of a predetermined selected file display region) displays files that the user has selected, for example by double-clicking with the mouse 40, as icons in the selected file display portion 13. Information about the selected files is temporarily stored in the selected file storage portion 12.

The execution icon display window W3 displays icons of processes that the files can be subjected to (such as deleting, moving, displaying, or mailing the files).

Figure 2:
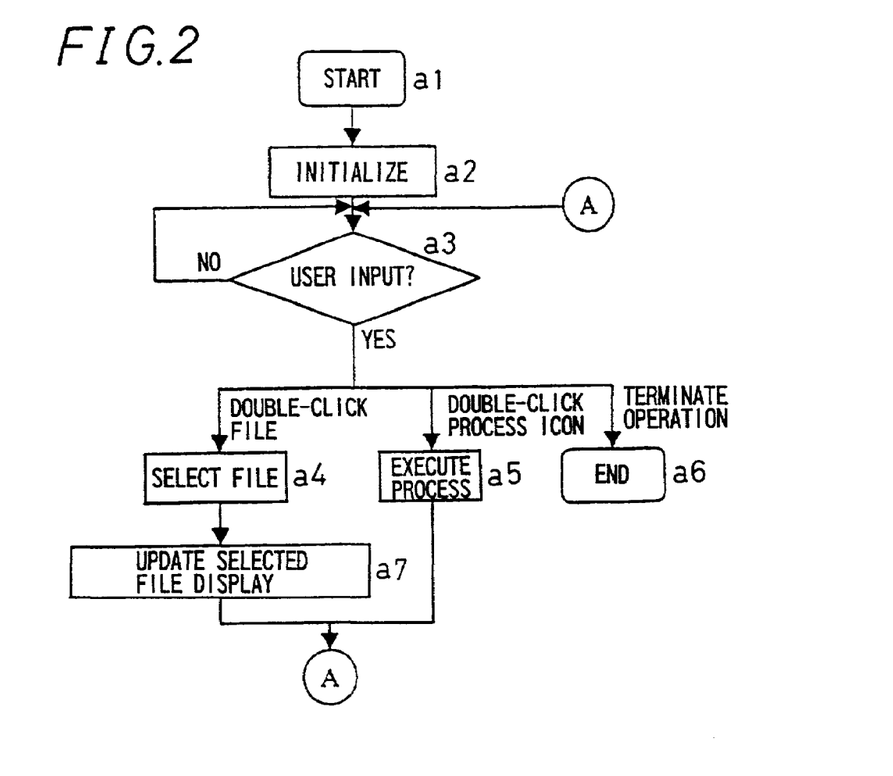
FIG. 2 is a flowchart illustrating the operating procedure for the file processing apparatus Z1 (Z3)

The following is an explanation of the procedure of an actual file processing operation. FIG. 2 is a flowchart of a file processing procedure for the file processing apparatus Z1.

When the user processes a file, first of all, the file processing apparatus Z1 is started at Step a1, then a predetermined initialization process is performed at Step a2, and then the window W shown in FIG. 3 is displayed on the monitor 20. At Step a3, it is determined whether there is a user input from the keyboard 30 or the mouse 40, and while ascertaining the contents of the files and comparing among the files with the icons displayed as thumbnails in the file display window W1, the user can select files to be processed by double-clicking, whereupon the procedure advances to Step a4. Once a file has been selected, it is stored in the selected file storage portion 12 and displayed with the selected file display portion 13 as an icon in the selected file display window W2 at Step a7, so that the file selection can be performed easily and accurately while scrolling down the window, for example.

To execute processes after the file selection, the process icons displayed in the execution icon display window W3 are double-clicked, for example. When any of the process icons is double-clicked, the procedure advances to Step a5, and the process execution portion 14 subjects the files stored in the selected file storage portion 12 to the process corresponding to the process icon. If the user chooses to end the process, the procedure proceeds to Step a6, and the file processing is terminated.

In this manner, the file processing apparatus Z1 in Embodiment 1 displays selected files as icons in the selected file display window W2, so that files can be selected easily and accurately by scrolling down the window, for example.

Moreover, in the icons displayed in the file display window W1, the contents of the files is displayed as thumbnails, so that it is possible to prevent mistakes, such as the selection of the wrong file, and easy to compare among a plurality of files.

Embodiment 2

The following is an explanation of a file processing apparatus Z2, which is an improvement of the file processing apparatus Z1.

Figure 4:
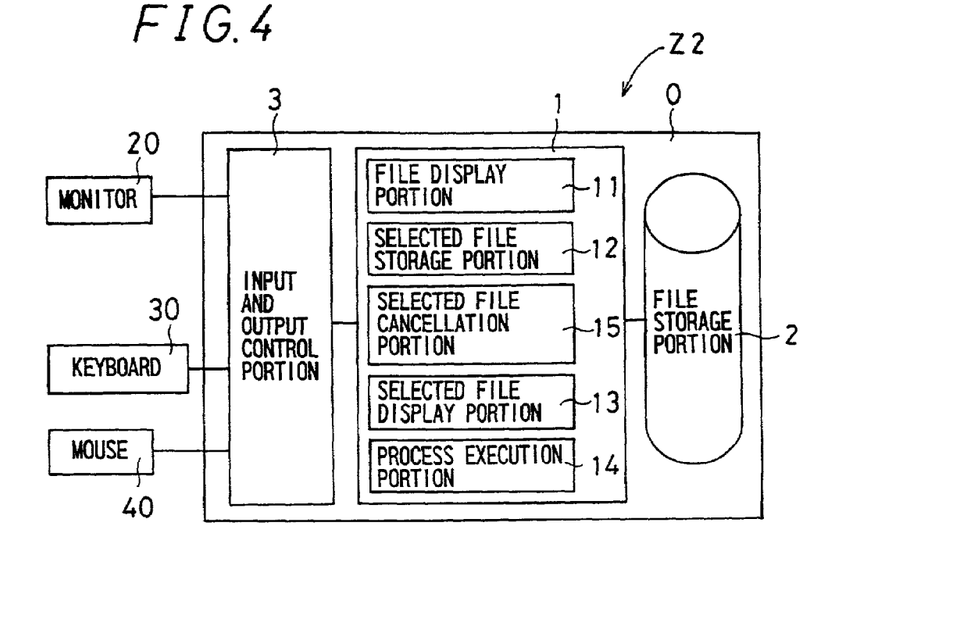
FIG. 4 is a block diagram showing the general configuration of a file processing apparatus Z2 in accordance with Embodiment 2 of the invention.

As shown in FIG. 4, the file processing apparatus Z2 further includes a selected file cancellation portion 15, in addition to the elements in the file operating portion 1 of the file processing apparatus Z1.

Figure 6:
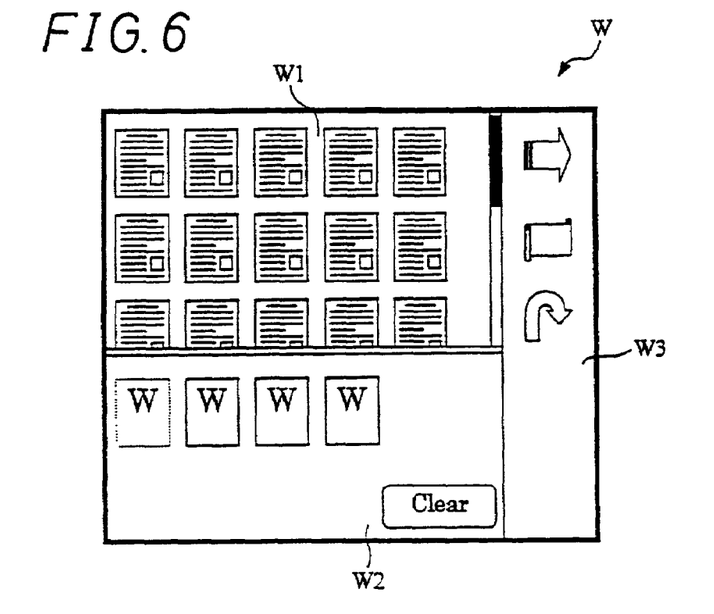
FIG. 6 shows an example of a display screen for the file processing apparatus Z2.
Figure 7:
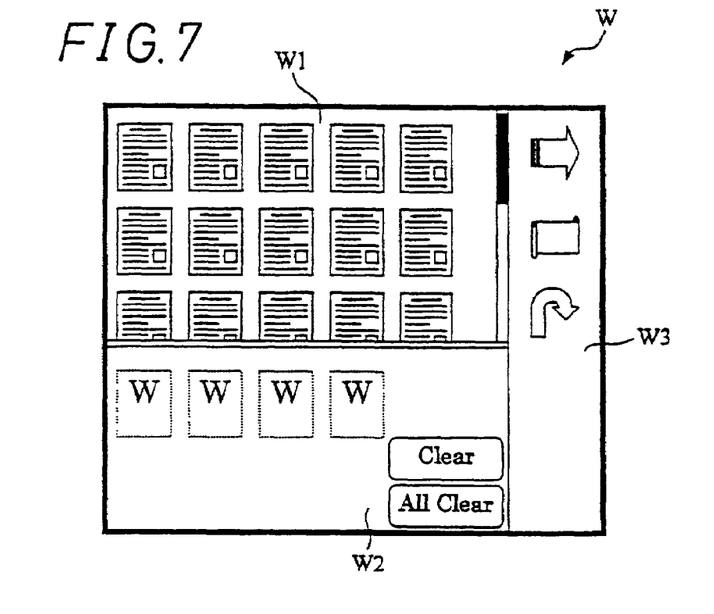
FIG. 7 shows an example of a display screen for the file processing apparatus Z2.

Also, as shown in FIG. 6, a "Clear" button is displayed for example in the selected file display window W2. Alternatively, it is also possible to display a "Clear" button and an "All Clear" button, as shown in FIG. 7.

Figure 5:
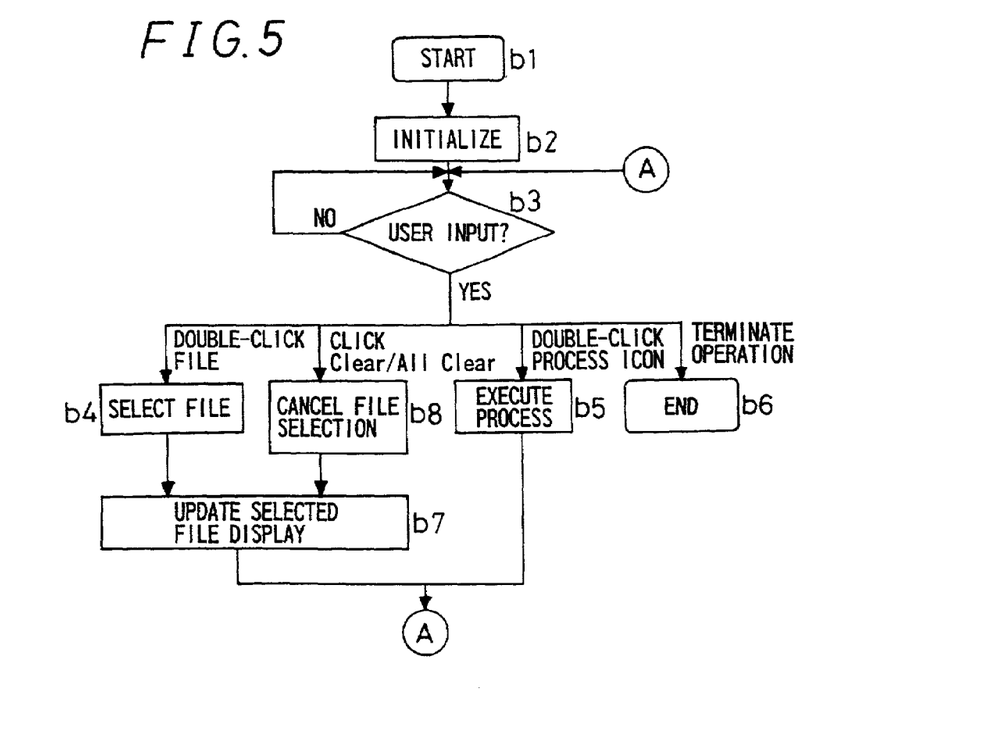
FIG. 5 is a flowchart illustrating the operating procedure for the file processing apparatus Z2.

FIG. 5 is a flowchart of a file processing procedure for the file processing apparatus Z2. The operations of Steps b1 to b7 are the same as the corresponding operations at Steps a1 to a7 in FIG. 2.

If the user clicks on the "Clear" button, after the user has selected one or more icons displayed in the selected file display window W2, then the procedure advances from Step b3 to Step b8, and the selected file cancellation portion 15 deletes the selected files from among the files that are stored in the selected file storage portion 12. Furthermore, if the user clicks the "All Clear" button without selecting any files, then the procedure advances to Step b8, and the selected file cancellation portion 15 deletes all files that are stored in the selected file storage portion 12. At the same time, the selected icons or all icons are deleted accordingly from the icons displayed in the selected file display window W2.

In this manner, with the file processing apparatus Z2 in accordance with Embodiment 2 of the invention, a portion or all of the files that have been selected and displayed as icons in the selected file display window W2 easily can be canceled if necessary, so that files can be compared and examined with less commitment.

It should be noted that the "Clear" button and the "All Clear" button do not have to be displayed all the time, and that it is also possible to display these buttons only temporarily, for example when right-clicking with the mouse. Furthermore, instead of clicking the "Clear" button and the "All Clear" button, it is also possible to cancel the selection by double-clicking files inside the selected file display window W2, for example.

Embodiment 3

The following is an explanation of a file processing apparatus Z3, which is an improvement of the file processing apparatus Z1 (referring to the general configuration diagram and the operation flowchart shown in FIGS. 1 and 2).

Figure 8:
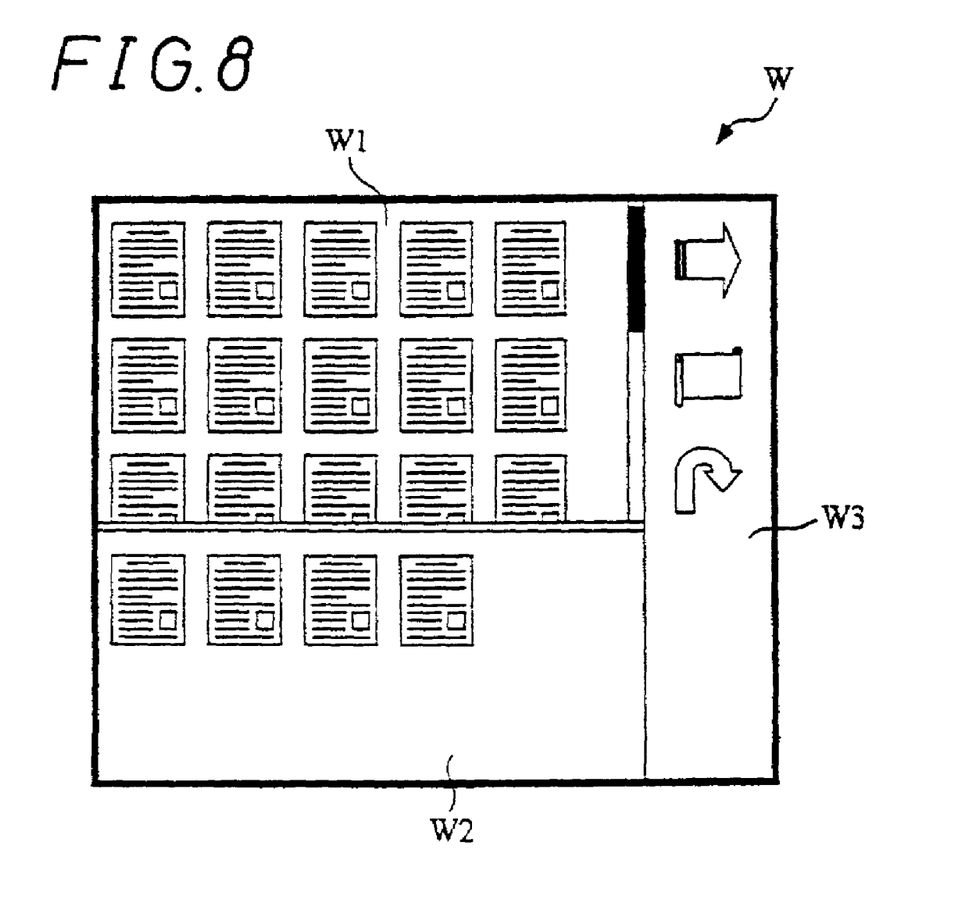
FIG. 8 shows an example of a display screen for the file processing apparatus Z3.

The selected file display portion 13 of the file processing apparatus Z3 displays files selected by the user in the file display window W1 as icons in the selected file display window W2, displaying the contents of the files as thumbnails (see FIG. 8).

Thus it is easy to compare and examine the selected files. Moreover, if also the selected file cancellation portion 15 of the file processing apparatus Z2 in Embodiment 2 is provided, then it is possible temporarily to select a plurality of files displayed at a remote position within the file display window W1, display them as thumbnails in the selected file display window W2, and then to cancel the selection of files that are deemed to be unnecessary upon further comparison and deliberation.

Embodiment 4

The following is an explanation of a file processing apparatus Z4, which is an improvement of the file processing apparatus Z3.

Figure 9:
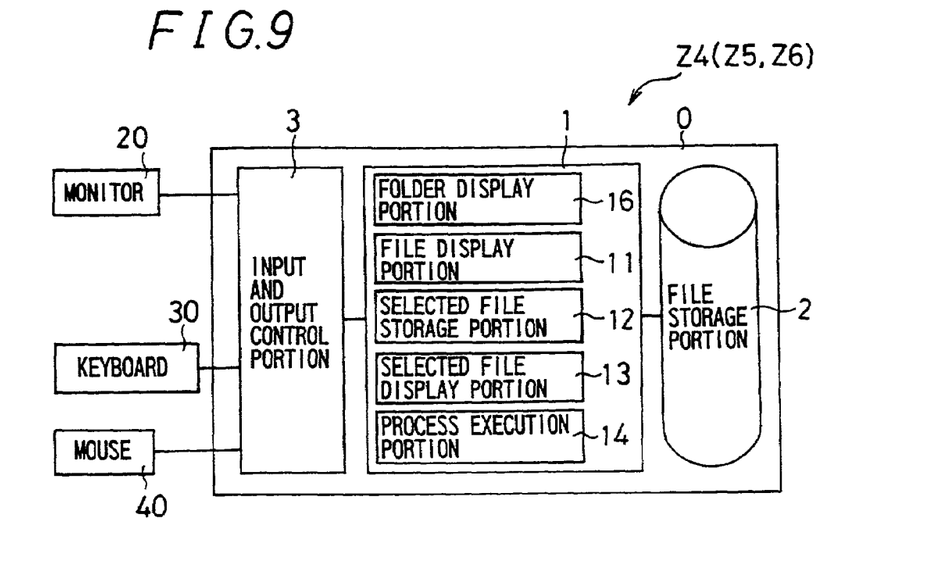
FIG. 9 is a block diagram showing the general configuration of a file processing apparatus Z4 (Z5, Z6) in accordance with Embodiment 4 (5, 6) of the invention.

As shown in FIG. 9, the file processing apparatus Z4 further includes a folder display portion 16, in addition to the elements in the file operating portion 1 of the file processing apparatus Z3.

Figure 11:
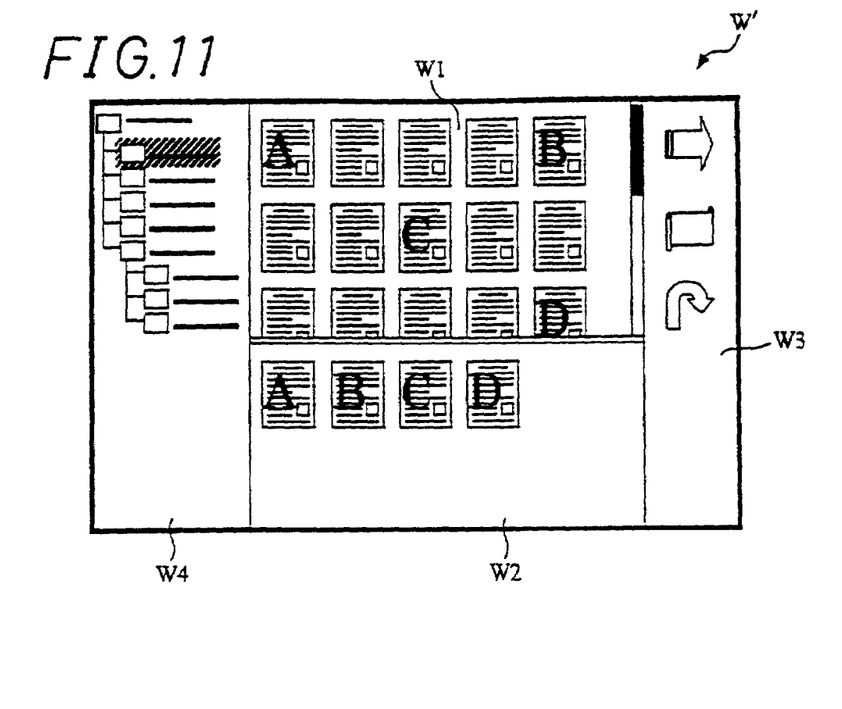
FIG. 11 shows an example of a display screen for the file processing apparatus Z4 (when files have been selected from among a first folder)

As shown in FIG. 11, the window W' displayed by the file processing apparatus Z4 also includes a folder tree display window W4, in addition to the file display window W1, the selected file display window W2, and the execution icon display window W3. With this folder tree display window W4, the folders in the file storage portion 2 are displayed in tree form by the folder display portion 16. Moreover, the files in the folders that are selected in the folder tree display window W4 are displayed by the file display portion 11 in the file display window W1.

Figure 10:
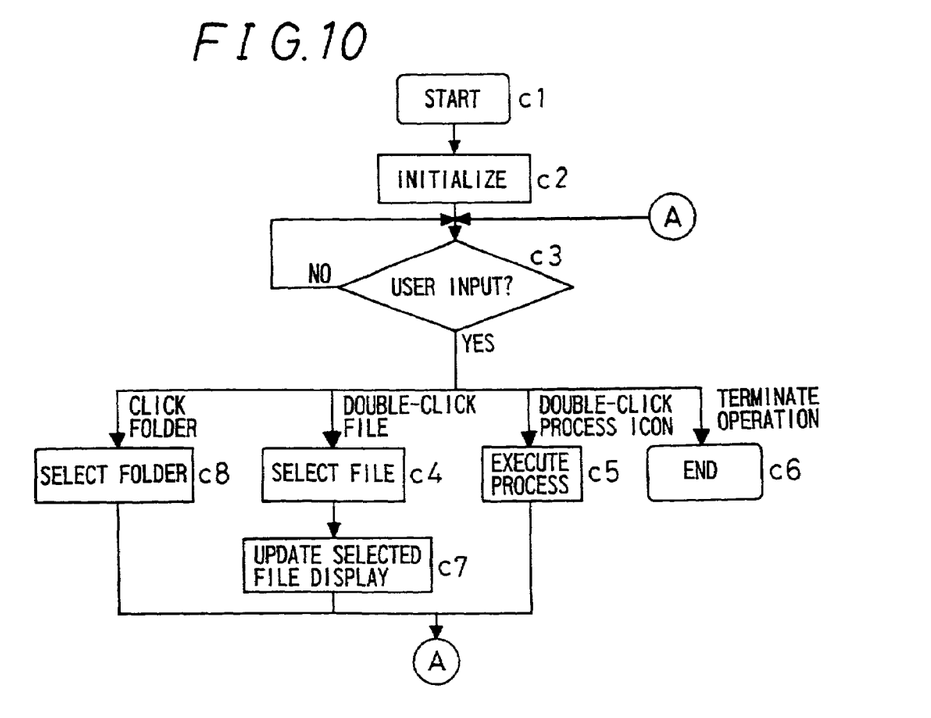
FIG. 10 is a flowchart illustrating the operating procedure for the file processing apparatus Z4 (Z5, Z6)

FIG. 10 is a flowchart of a file processing procedure for the file processing apparatus Z4. The operations of Steps c1 to c7 are the same as the corresponding operations at Steps a1 to a7 in FIG. 2. If the user selects a folder in the folder tree display window W4, then the procedure advances from Step c3 to Step c8, and the files in the selected folder are displayed by the file display portion 11.

Moreover, the selected file display portion 13 of the file processing apparatus Z4 is configured such that files selected from among different folders are displayed together in the selected file display portion W2, just like files selected from among the same folder, and the selected file storage portion 12 stores the files selected from among these different folders.

Figure 12:
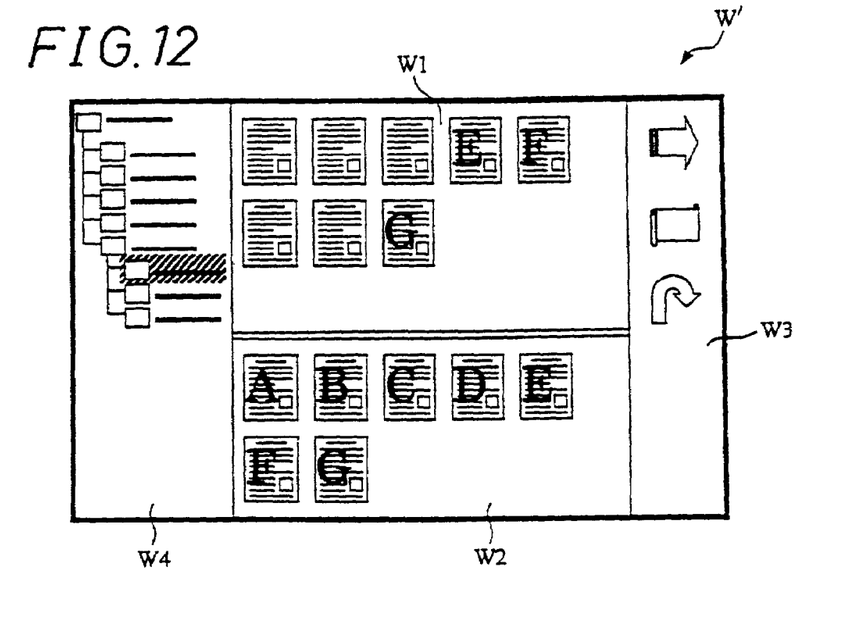
FIG. 12 shows an example of a display screen for the file processing apparatus Z4 (when files have been selected from a different folder than in FIG. 11)

With this configuration, it is possible to select the files A, B, C, and D from a predetermined folder, as shown in FIG. 11, and then to switch to a different folder and select the files E, F, and G, as shown in FIG. 12.

After a plurality of files have been selected from among different folders, it is possible to subject this plurality of files spanning different folders to processing at once (together), for example by double-clicking a process icon displayed in the execution icon display window W3.

Thus, with the file processing apparatus Z4 in Embodiment 4, it is possible to subject a plurality of files spanning different folders to processing at once (together). Furthermore, files in different folders are displayed in the selected file display window W2, just like files selected from the same folder, so that it is easy to compare and examine files, regardless of where the files are located.

Embodiment 5

The following is an explanation of a file processing apparatus Z5, which is an improvement of the file processing apparatus Z4 (referring to the general configuration diagram and the operation flowchart shown in FIGS. 9 and 10, as for the file processing apparatus Z4.).

Figure 13:
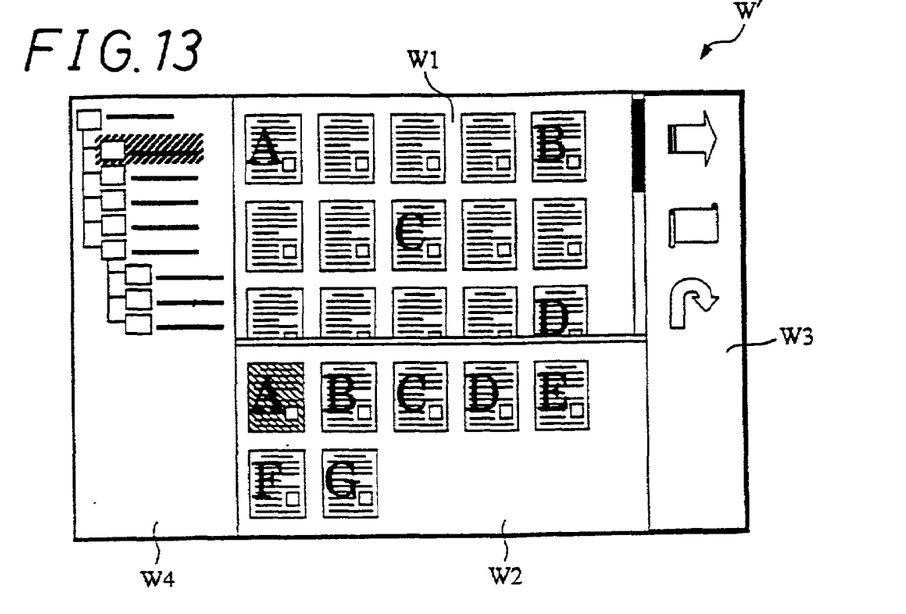
FIG. 13 shows an example of a display screen for the file processing apparatus Z5.

If a file displayed in the selected file display window W2 is clicked, then the folder display portion 16 of the file processing apparatus Z5 highlights its icon, as well as the folder containing the clicked file in the folder tree display of the folder tree display window W4 (see FIG. 13).

Thus, the user does not have to remember the folder in which a selected file is located, and it is easy to rethink the selection of files that have been selected only preliminarily and compare them with other files within the same folder.

Embodiment 6

The following is an explanation of a file processing apparatus Z6, which is an improvement of the file processing apparatus Z4 (referring to the general configuration diagram and the operation flowchart shown in FIGS. 9 and 10, as for the file processing apparatus Z4.).

Figure 14:
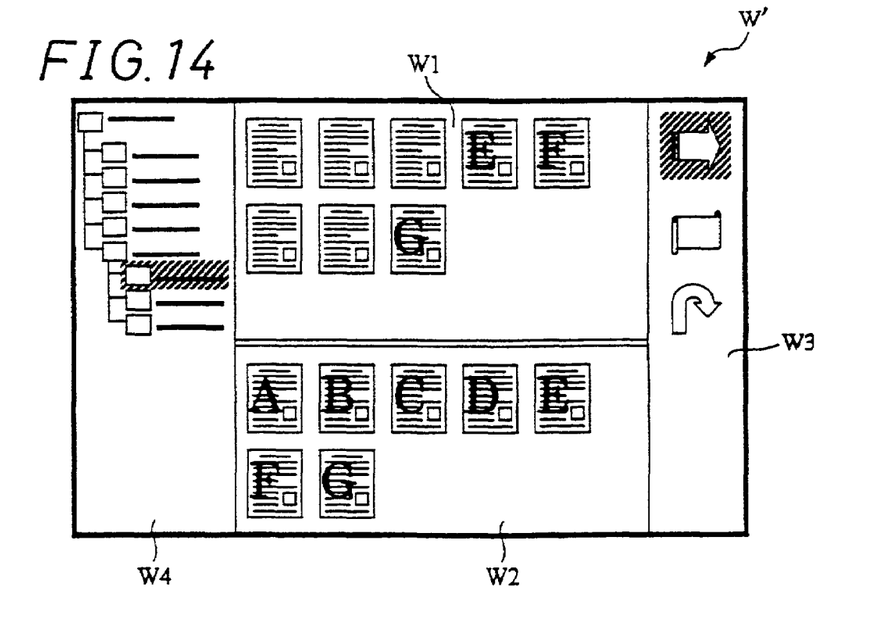
FIG. 14 shows an example of a display screen for the file processing apparatus Z6.

After the selected files have been subjected to a predetermined process by clicking a process icon, the selected file storage portion 12 and the selected file display portion 13 of the file processing apparatus Z6 still continue to store and display the selected files (see FIG. 14).

Thus, it is not necessary to perform the troublesome procedure of repeatedly selecting and processing files in order to subject the same group of selected files to a plurality of processes, which makes the procedure simpler.

Embodiment 7

The following is an explanation of a file processing apparatus Z7, which is an improvement of the file processing apparatus Z4.

Figure 15:
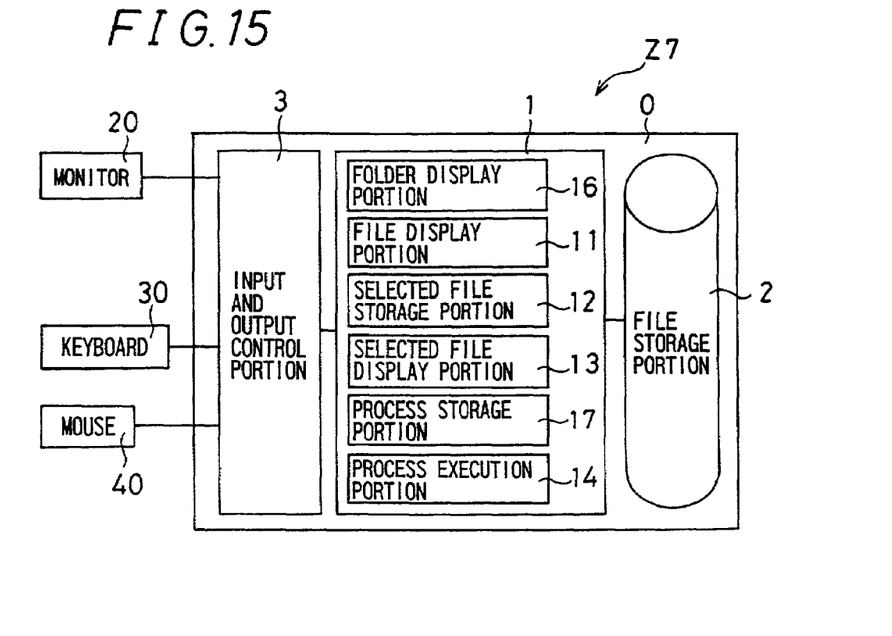
FIG. 15 is a block diagram showing the general configuration of a file processing apparatus Z7 in accordance with Embodiment 7 of the invention.
Figure 17:
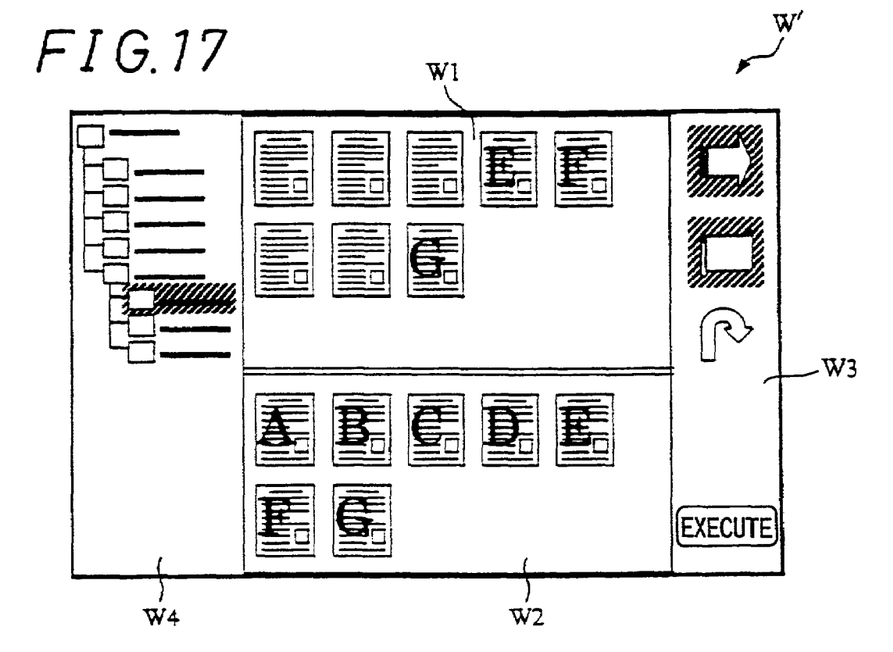
FIG. 17 shows an example of a display screen for the file processing apparatus Z7.

As shown in FIG. 15, the file processing apparatus Z7 further includes a process storage portion 17, in addition to the elements in the file operating portion 1 in the file processing apparatus Z4. Furthermore, as shown in FIG. 17, in the file processing apparatus Z7, the execution icon display window W3 displays an "Execute" button.

When one or a plurality of process icons in the execution icon display window W3 are clicked after the user has terminated the file selection, then the process storage portion 17 highlights the clicked process icons, and stores these processes (that is, which processes have been specified). When subsequently the "Execute" button is clicked, the process execution portion 14 subjects the files stored in the selected file storage portion 12 in order to the one or more processes stored in the process storage portion 17.

Figure 16:
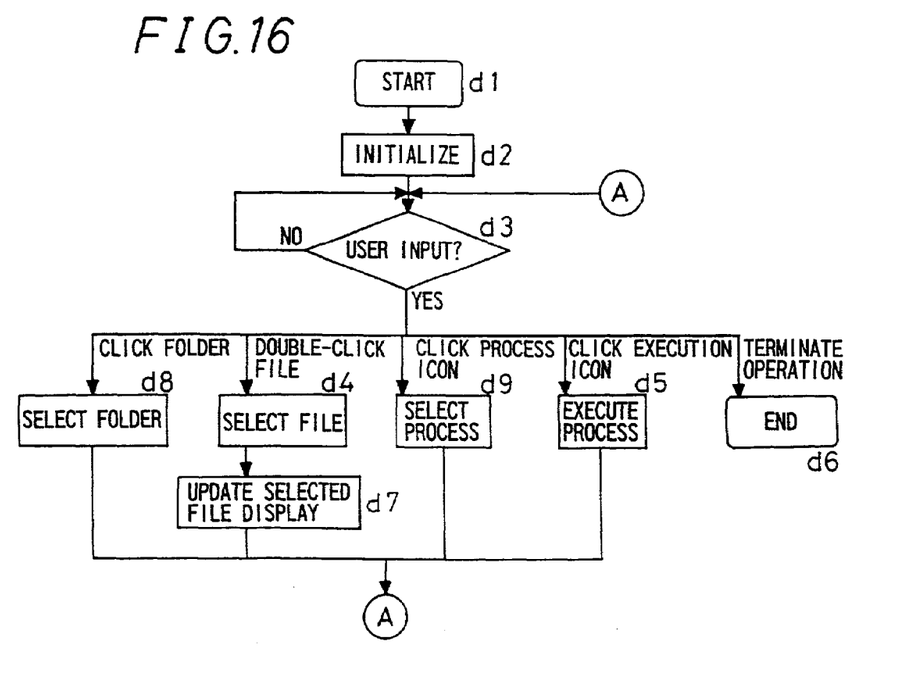
FIG. 16 is a flowchart illustrating the operating procedure for the file processing apparatus Z7.

FIG. 16 is a flowchart of a file processing procedure for the file processing apparatus Z7. The operations of Steps d1 to d8 are the same as the corresponding operations at Steps c1 to c8 in FIG. 10. If the user selects one or more process icons, then the procedure advances from Step d3 to Step d9, and the process storage portion 17 stores the selected one or more processes.

In this manner, with the file processing apparatus Z7, it is not necessary to perform the troublesome procedure of repeatedly selecting files and selecting processes in order to subject the same group of selected files to a plurality of processes, which makes the procedure simpler.

Embodiment 8

The following is an explanation of a file processing apparatus Z8, which is an improvement of the file processing apparatus Z4.

Figure 18:
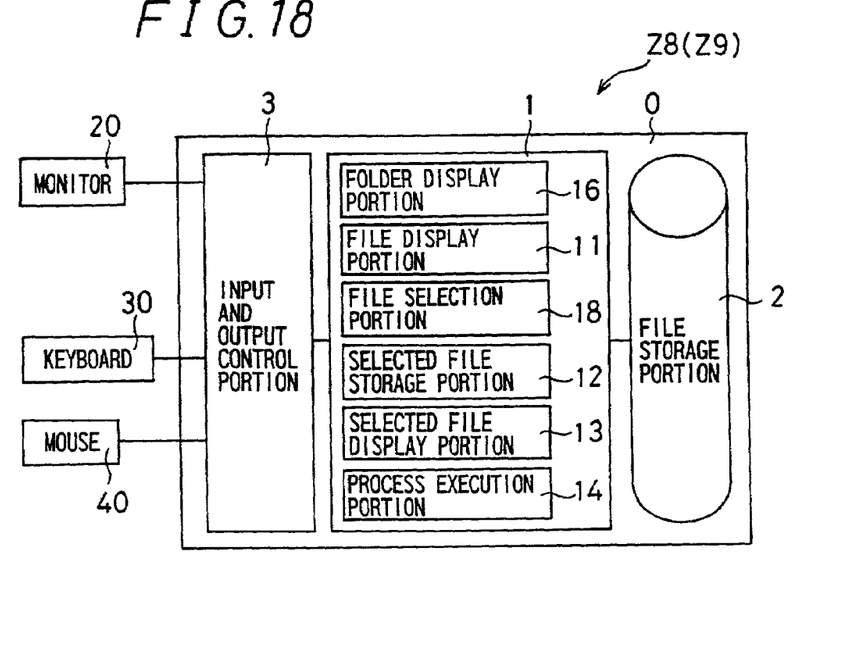
FIG. 18 is a block diagram showing the general configuration of a file processing apparatus Z8 (Z9) in accordance with Embodiment 8 (9) of the invention.

As shown in FIG. 18, the file processing apparatus Z8 further includes a file selection portion 18, in addition to the elements in the file operating portion 1 in the file processing apparatus Z4.

Figure 20:
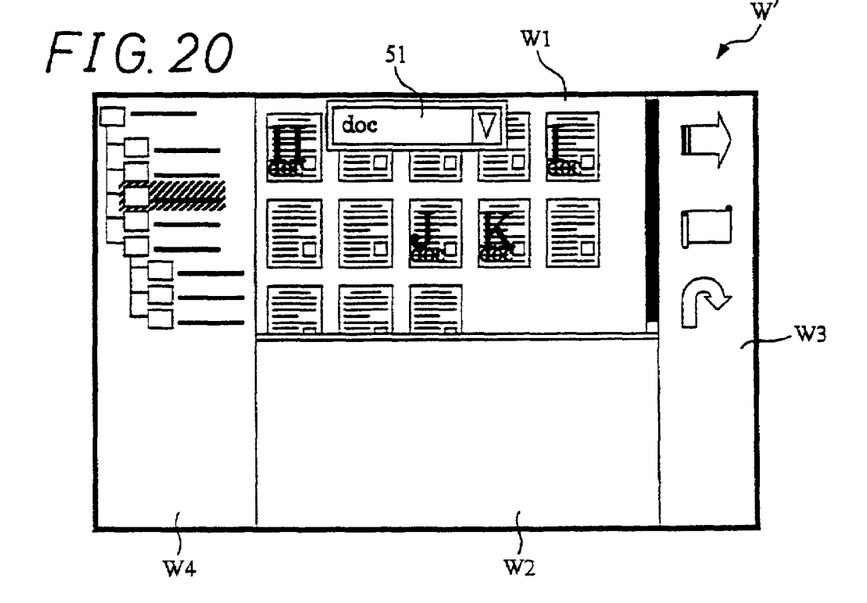
FIG. 20 shows an example of a display screen for the file processing apparatus Z8 (when a file selection condition has been set in the pull-down menu 51)
Figure 21:
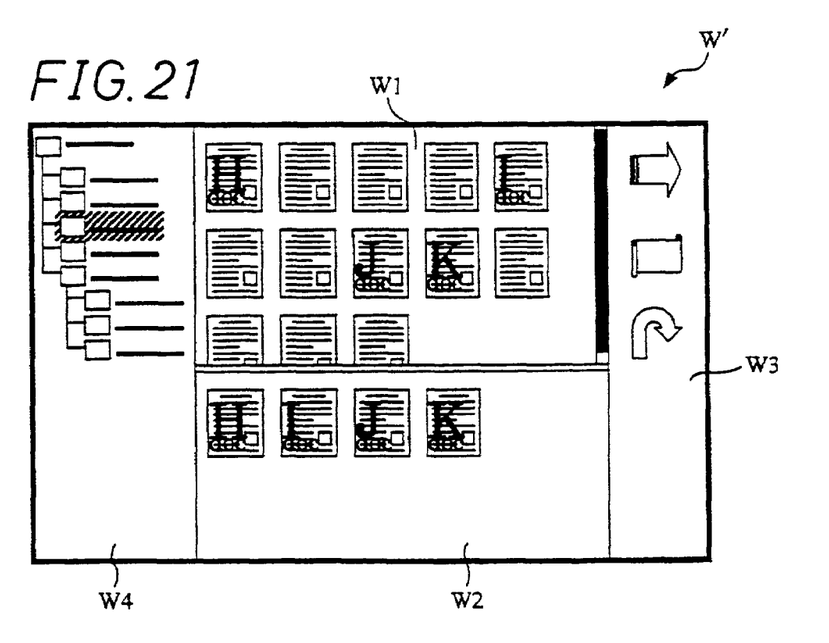
FIG. 21 shows an example of a display screen for the file processing apparatus Z8 (after automatic file selection with the set conditions)

When the user clicks for example the right mouse button during the selection of files, a pull-down menu 51 for setting file selection conditions is displayed (see FIG. 20). In this pull-down menu 51 selection conditions with regard to the file type, such as word file (doc), text file (txt) or bitmap file (bmp) are arranged in a menu. When the user selects one of the conditions in this pull-down menu 51 (in FIG. 20, "doc" is selected), then the file selection portion 18 selects the file matching the selected condition from the folder specified in the folder tree display window W4. The selected file display portion 13 then displays the files selected by the file selection portion 18 as icons in the selected file display window W2 (see FIG. 21), and the selected file storage portion 12 stores these files.

Figure 19:
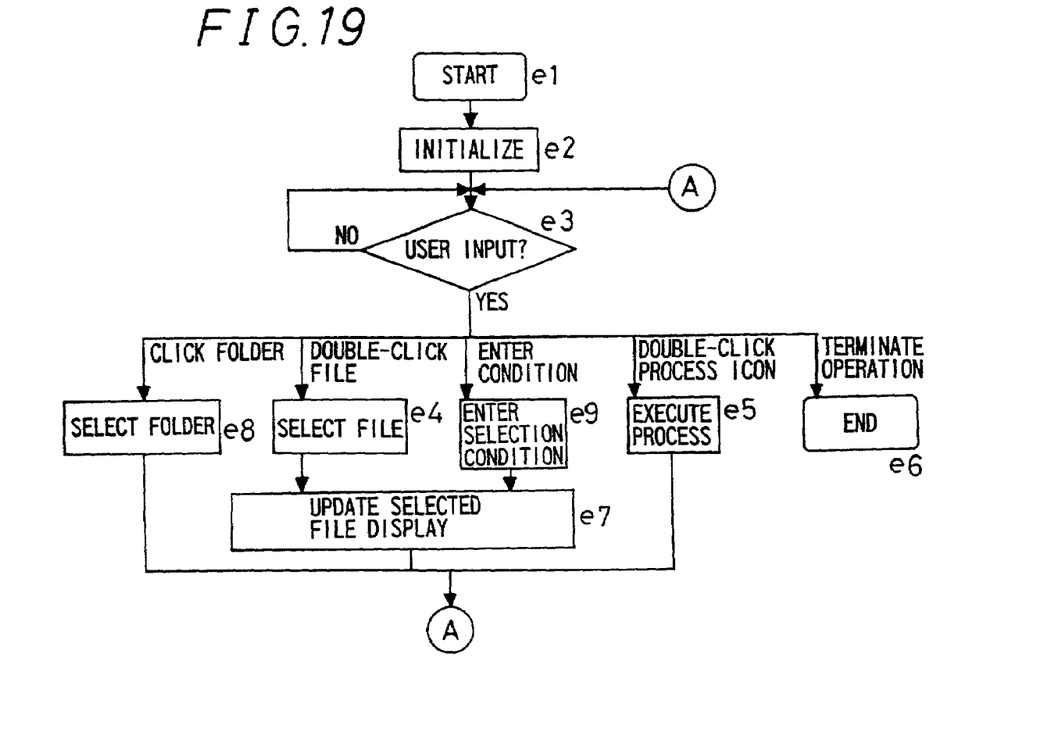
FIG. 19 is a flowchart illustrating the operating procedure for the file processing apparatus Z8 (Z9)

FIG. 19 is a flowchart of a file processing procedure for the file processing apparatus Z8. The operations of Steps e1 to e8 are the same as the corresponding operations at Steps c1 to c8 in FIG. 10. If the user selects a selection condition from the pull-down menu 51, then the procedure advances from Step e3 to Step e9, the file selection portion 18 selects the files matching this condition, and the procedure advances to Step e7.

In this manner, the file processing apparatus Z8 simplifies the file selection procedure, by making it possible to automatically select files matching predetermined conditions.

The file selection condition does not necessarily have to be the file type, and it is also possible to use such conditions as the file name or the date/time of the last renewal. Needless to say, there is no limitation to selecting conditions displayed by a menu, and it is also possible to enter user-specified conditions.

Embodiment 9

The following is an explanation of a file processing apparatus Z9, which is an improvement of the file processing apparatus Z8 (referring to the general configuration diagram and the operation flowchart shown in FIGS. 18 and 19, as for the file processing apparatus Z8).

Figure 22:
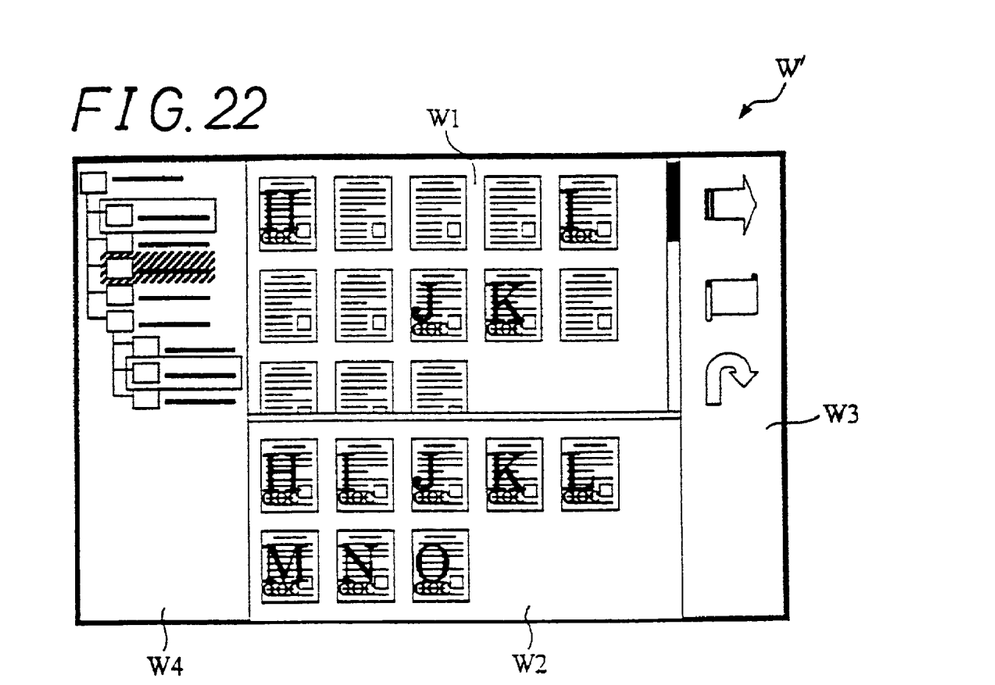
FIG. 22 shows an example of a display screen for the file processing apparatus Z9.

In the file processing apparatus Z9, it is possible to select a plurality of folders in the folder tree display window W4 (see FIG. 22), before (or after) setting the file selection conditions with the pull-down menu 51 (see FIG. 20).

The file selection portion 18 of the file processing apparatus Z9 selects files matching the conditions specified with the pull-down menu 51 (FIG. 20) from the plurality of folders specified in the folder tree display window W4.

Thus, the file selection procedure is simplified by broadening the range from which files can be selected automatically according to predetermined conditions from a specified folder to any arbitrary range.

The preceding examples merely illustrate the embodiments in correspondence with the claims. Needless to say, it is possible, if not preferable, to combine several or all of these embodiment.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A file processing apparatus comprising:
    file display means for displaying folders for selection in a folder selection region, and for displaying a plurality of predetermined data files including image files and text files in a predetermined file display region as icons, wherein when a folder in the folder selection region is selected then files from the selected folder are displayed by the file display means in the file display region as icons;
    selected file storage means, in response to a selection request with regard to a predetermined file displayed in the file display region, for storing a selected file;
    selected file display means for displaying the selected file in a predetermined selected display region as an icon;
    process execution means, in response to a predetermined process request, for subjecting a file stored by the selected file storage means to a predetermined process;
    wherein a display screen of the file processing apparatus is divided into at least four different areas at a given point in time so as to include each of the file display region, the folder selection region, the selected display region, and a process display region, so that the display screen simultaneously displays each of the following at the given point in time: (a) the folders for selection in the folder selection region, (b) the icons of the plurality of predetermined files in the file display region which are from selected folder(s) from the folder selection region, the file display region being different than the folder selection region, (c) at least the selected file in the selected display region which is different than the file display region, and (d) process icons in the process display region indicative of processes that the selected file can be subjected to; and
    wherein a user can select files from a first folder when the first folder is selected in the folder selection region, and can thereafter select different files from a second folder when the second folder is selected in the folder selection region, so that the selected files from the first folder and the selected files from the second folder are displayed simultaneously in the selected display region and can be subjected to processing together when a process icon in the process display region is selected.

2. The file processing apparatus of claim 1, wherein the file display means displays the files in the file display regions as thumbnails.

3. The file processing apparatus of claim 1, further comprising: selected file cancellation means, in response to a predetermined selection cancel request, for canceling the selection of a portion or all of the files stored by the selected file storage means.

4. The file processing apparatus of claim 2, further comprising: selected file cancellation means, in response to a predetermined selection cancel request, for canceling the selection of a portion or all of the files stored by the selected file storage means.

5. The file processing apparatus of claim 1, wherein the selected file display means displays files as thumbnails in the selected file display region.

6. The file processing apparatus of claim 4, wherein the selected file display means displays files as thumbnails in the selected file display region.

7. The file processing apparatus of claim 1, wherein the selected file storage means stores files selected from among a plurality of folders.

8. The file processing apparatus of claim 6, wherein the selected file storage means stores files selected from among a plurality of folders, and that the selected file display means displays these files in one selected file display region.

9. The file processing apparatus of claim 1, wherein the selected file storage means keeps storing the selected files, even after a process has been executed by the process execution means, until a predetermined selection cancel request.

10. The file processing apparatus of claim 8, wherein the selected file storage means keeps storing the selected files, even after a process has been executed by the process execution means, until a predetermined selection cancel request.

11. The file processing apparatus of claim 1, further comprising: process storage means for storing a plurality of process requests, wherein the process execution means subjects the files stored by the selected file storage means to a plurality of processes, in response to the plurality of process requests stored in the process storage means.

12. The file processing apparatus of claim 10, further comprising: process storage means for storing a plurality of process requests, wherein the process execution means subjects the files stored by the selected file storage means to a plurality of processes, in response to the plurality of process requests stored in the process storage means.

13. The file processing apparatus of claim 1, further comprising: file selection means for selecting, from among an arbitrary plurality of files, those files that match a predetermined condition.

14. The file processing apparatus of claim 12, further comprising: file selection means for selecting, from among an arbitrary plurality of files, those files that match a predetermined condition.

15. The file processing apparatus of claim 13, wherein the file selection means selects files from within an arbitrarily defined range.

16. The file processing apparatus of claim 14, wherein the file selection means selects files from within an arbitrarily defined range.

17. A computer readable storage medium on which a program is stored that allows a computer to operate as the file processing apparatus of claim 1.

18. A computer readable storage medium on which a program is stored that allows a computer to operate as the file processing apparatus of claim 16.

19. The file processing apparatus of claim 1, wherein when a file displayed in the selected display region is clicked, then its icon is highlighted in the selected display region and the folder containing the clicked file is highlighted in the folder selection region.

20. A file processing apparatus comprising:

file display means for displaying a tree of folders in tree form in a tree display window, and for displaying a plurality of predetermined data files including image files and text files in a predetermined file display region as icons, wherein when a folder in the tree display window is selected then files from the selected folder are displayed by the file display means in the file display region as icons;

selected file storage means, in response to a selection request with regard to a predetermined file displayed in the file display region, for storing a selected file;

selected file display means for displaying the selected file in a predetermined selected display region as an icon;

process execution means, in response to a predetermined process request, for subjecting a file stored by the selected file storage means to a predetermined process;

wherein a display screen of the file processing apparatus is divided into at least four different areas at a given point in time so as to include each of the file display region, the tree display window, the selected display region, and a process display region, so that the display screen simultaneously displays each of the following at the given point in time: (a) the tree of folders in tree form in the tree display window, (b) the icons of the plurality of predetermined files in the file display region which are from selected folder(s) from the tree display window, the file display region being different than the tree display window, (c) at least the selected file in the selected display region which is different than the file display region, and (d) process icons in the process display region indicative of processes that the selected file can be subjected to; and wherein a user can select filed from a first folder when the first folder is selected in the tree display window, and can thereafter select different files from a second folder when the second folder is selected in the tree display window, so that the selected files from the first folder and the selected files from the selected folder are displayed simultaneously in the selected display region and can be subjected to processing together when a process icon in the process display region is selected.

* * * * *